United States Patent [19]

Bauck et al.

[11] 4,400,748

[45] Aug. 23, 1983

[54] FLEXIBLE MAGNETIC DISK DRIVE USING A RIGID CARTRIDGE

[75] Inventors: Randall C. Bauck, Davis County; S. Peter Kleczkowski; Anton J. Radman, both of Weber County, all of Utah

[73] Assignee: Iomega Corporation, Ogden, Utah

[21] Appl. No.: 256,320

[22] Filed: Apr. 22, 1981

[51] Int. Cl.$^3$ ............................................. G11B 5/016
[52] U.S. Cl. ...................................... 360/99; 360/133
[58] Field of Search .................................. 360/97–99, 360/131–133, 135, 102

[56] References Cited

U.S. PATENT DOCUMENTS

| | | | |
|---|---|---|---|
| 3,609,722 | 9/1971 | Zenzefilis | 360/97 |
| 3,678,481 | 7/1972 | Dalziel et al. | 340/174.1 C |
| 3,696,350 | 10/1972 | Cohen et al. | 360/99 |
| 3,815,150 | 6/1974 | Stoddard et al. | 360/97 |
| 3,975,768 | 8/1976 | Jacques et al. | 360/99 |
| 3,990,111 | 11/1976 | Elliott | 360/99 |
| 4,074,330 | 2/1978 | Norton et al. | 360/102 |
| 4,089,029 | 5/1978 | Castrodale et al. | 360/99 |
| 4,125,883 | 11/1978 | Rolph | 360/99 |
| 4,131,199 | 12/1978 | Hatchett et al. | 360/133 X |
| 4,152,740 | 5/1979 | Stratton | 360/99 |

FOREIGN PATENT DOCUMENTS 2191189 2/1974 France .
2309012 11/1976 France .
2396381 1/1979 France .

OTHER PUBLICATIONS

IBM Technical Disclosure Bulletin, R. B. Henderson, Flexible Disk Cartridge Arrangement, vol. 24, No. 1A, Jun., 1981.

*Primary Examiner*—Alfred H. Eddleman
*Assistant Examiner*—Kin Wong
*Attorney, Agent, or Firm*—Woodcock, Washburn, Kurtz, Mackiewicz & Norris

[57] ABSTRACT

A cartridge for a flexible magnetic disk includes a rigid box with an opening on one side which is normally closed by a slider. When the cartridge is inserted into the drive, the slider moves to the open position in which the disk can be engaged to rotate it in read/write relationship with a magnetic head. As the cartridge is inserted, a fixed Bernoulli plate in the drive enters the cartridge through an edge thereof. The disk is rotated against the Bernoulli plate to provide stability.

17 Claims, 5 Drawing Figures

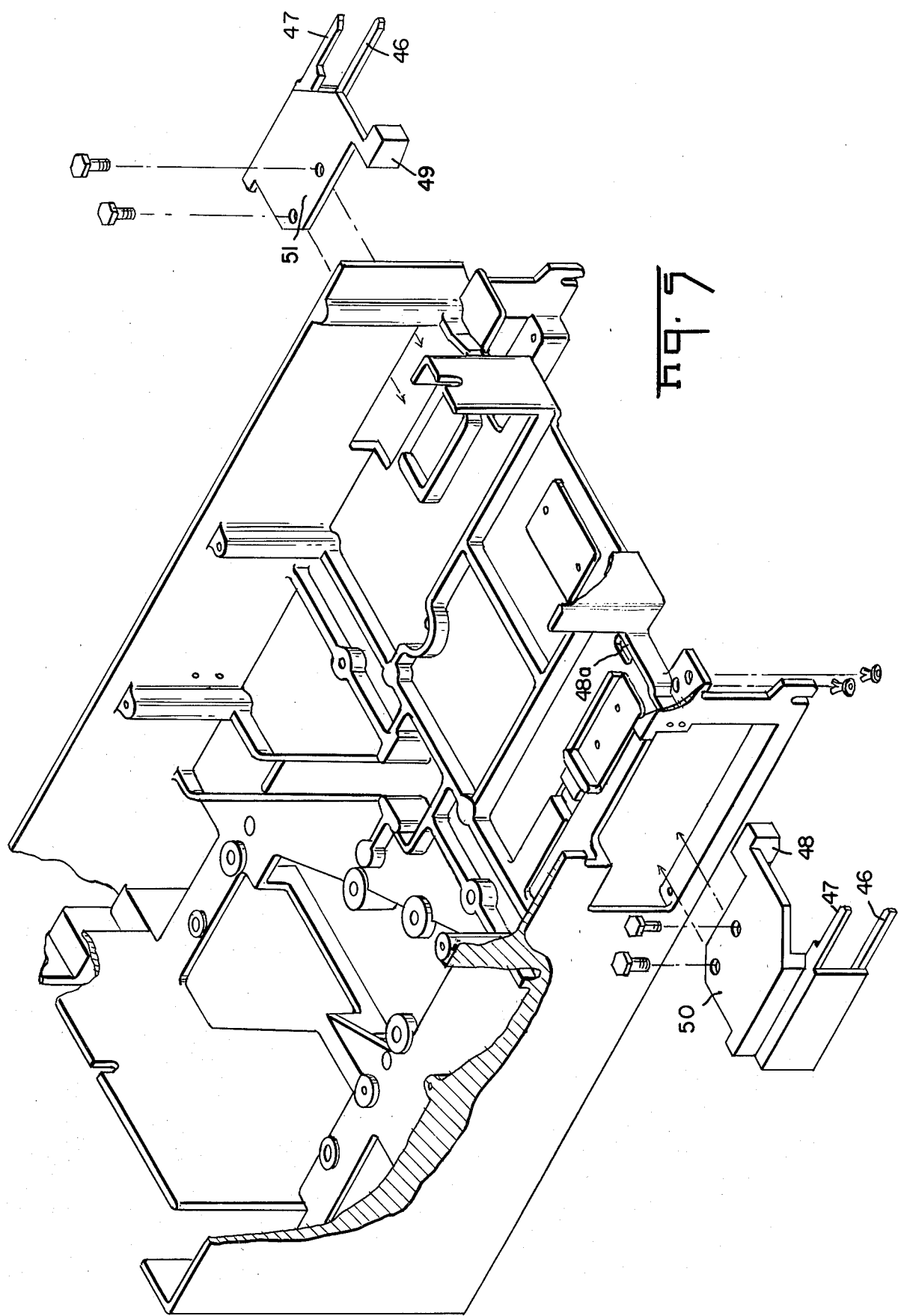

FLEXIBLE MAGNETIC DISK DRIVE USING A RIGID CARTRIDGE

BACKGROUND OF THE INVENTION

This invention relates to magnetic disk drives, and to a new cartridge for a flexible magnetic disk.

Recently, magnetic disk drives which write and read digital data from flexible magnetic disks have been extensively used. These are frequently referred to as "floppy" disks and "floppy disk drives." These drives have been extensively used for small, so-called microcomputer, systems, for word-processing applications and the like. The flexible disk cartridge includes a relatively thin, flexible jacket which is inserted into the floppy disk drive. The disk drive clamps the flexible disk onto a motor shaft which rotates the disk which is contacted by a read/write head. This cartridge exposes certain areas of the disk recording surface to dust contamination, liquid spillage, fingerprints, and scratching. Also, the flexible jacket allows the possibility of mechanical damage to the entire disk. Examples of floppy disk drives which accept this type of flexible cartridge are shown in U.S. Pat. Nos. 3,990,111—Elliott, 3,678,481—Dalziel et al., 3,815,150—Stoddard et al., 4,125,883—Rolph, and 4,089,029—Castrodale et al. Floppy disk drives have the great advantage of ease of insertion and changing the magnetic disk cartridge so that the operator can select the disk cartridge upon which the drive is to operate. However, present day floppy disk drives are not capable of operating with the precision, high speed and reliability which is present in the rigid disk drives. Floppy disk drives usually have linear actuators with access for the actuator being provided through an opening in the cartridge. U.S. Pat. No. 4,074,330—Norton et al. shows a disk drive having a Bernoulli plate for stabilizing a flexible disk to prevent flutter and to maintain an air bearing.

Rigid disk drives, such as the IBM 3350, usually have a fixed rigid magnetic media. The magnetic heads do not contact the magnetic surface, but ride on a thin film of air. Because of this, and other features, these disk drives are capable of extremely precise and high speed operation.

High speed and precision are also achieved in minicomputer disk drives which accept rigid cartridges, or disk packs, which enclose and protect the rotating magnetic disk. In such disk packs, the magnetic disk surface is mounted on a precision rigid substrate which is rotatable inside the disk packs. These disk packs are expensive and they cannot be changed on the machine with the same ease with which the so-called "floppy" disk cartridges can be inserted and removed.

It is an object of the present invention to provide a cartridge for a flexible disk which provides ease of insertion and removal and relatively low expense, while at the same time providing good protection for the flexible disk and allowing high speed reliable performance of the disk drive.

SUMMARY OF THE INVENTION

In accordance with the present invention, a flexible magnetic disk is enclosed in a rigid box which is normally completely closed. When the cartridge is inserted into the disk drive it engages a Bernoulli plate which is fixed in the disk drive. This plate engages a slider on the cartridge. As the cartridge is inserted into the drive, the slider is moved to an open position so that the flexible disk can be engaged by the hub of a motor which rotates the disk and so that the rotating surface is in a read/write relationship with a magnetic head. Access for a rotary actuator is through this same opening from which the slider is moved.

As the cartridge is inserted into the drive, the Bernoulli plate enters the cartridge through a normally closed edge of the cartridge. After the cartridge is inserted, the flexible disk is rotated against the Bernoulli plate with the read/write head floating on an air bearing above the surface of the magnetic disk. The head protrudes through the Bernoulli plate. Therefore, both the Bernoulli plate and the head are on the same side of the disk.

When the cartridge is out of the disk drive, the slider is locked in the closed position to prevent contamination of, or tampering with, the flexible disk surface. This locking mechanism is released by engagement with the Bernoulli plate when the cartridge is inserted into the drive. Other features of the cartridge prevent access to the cartridge except when the cartridge is properly inserted into the disk drive, and ensure proper insertion of and removal of the cartridge from the drive.

It is an object of the present invention to provide a magnetic disk cartridge having better protection of the magnetic disk from contamination and better protection of the magnetic disk from user tampering.

It is another object of the present invention to provide good mechanical protection for the disk by a completely rigid closure.

It is another object of the present invention to provide a magnetic disk cartridge which registers the magnetic disk next to a Bernoulli plate in the disk drive so that the magnetic disk can be rotated in proximity to the plate in a manner which stabilizes the flexible disk for the purpose of recording.

The foregoing and other objects and features of the invention will be better understood from the following more detailed description and appended claims.

SHORT DESCRIPTION OF THE DRAWINGS

FIG. 1 is a front perspective view of the disk drive;
FIG. 2 is an exploded view of the cartridge and disk;
FIG. 3 is an exploded view of the cartridge;
FIG. 4 is a view of the base casting and Bernoulli plate;
FIG. 5 is a view of the casting from the other side.

DESCRIPTION OF THE PREFERRED EMBODIMENT

Figure 1:
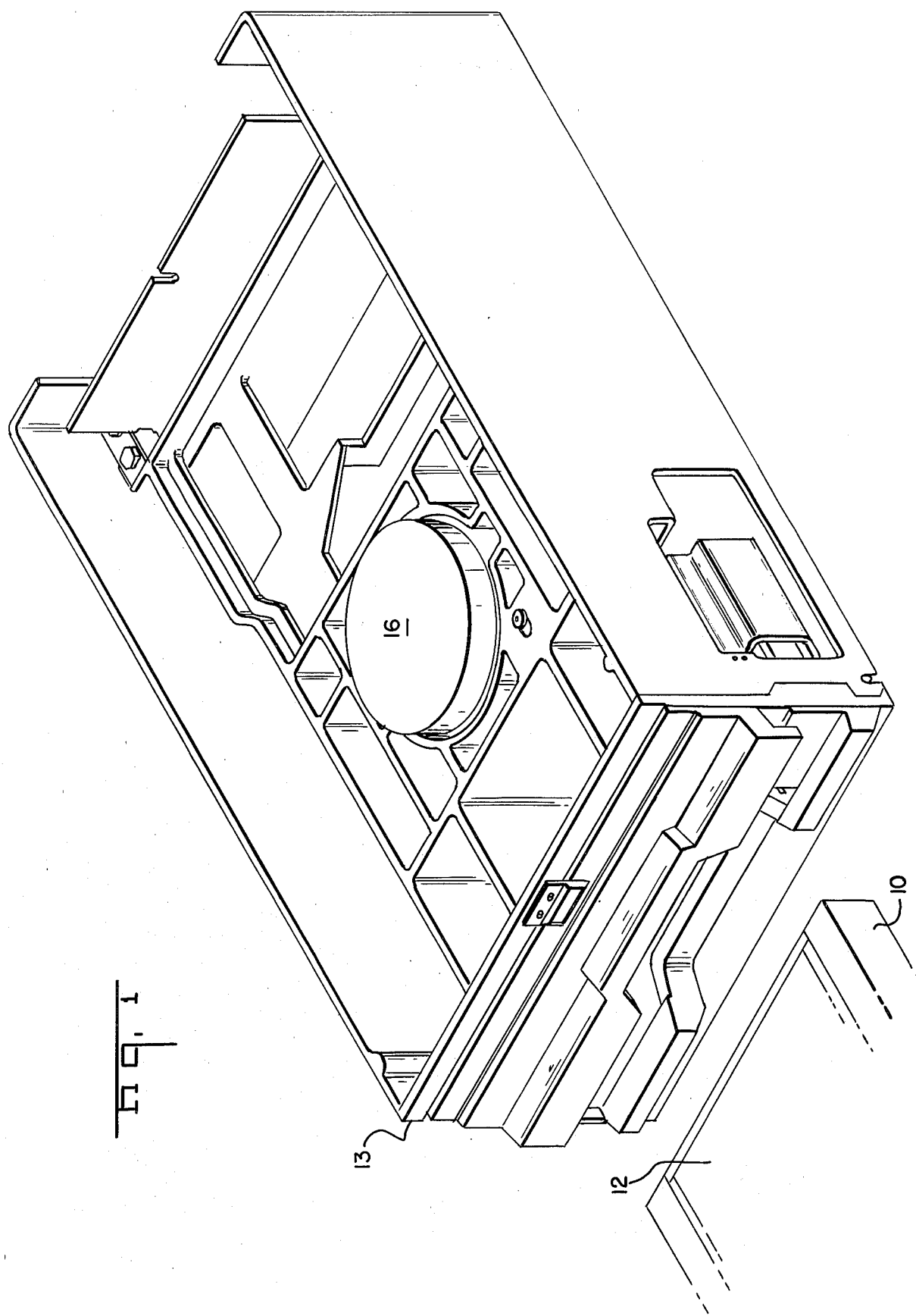
Figure 2:
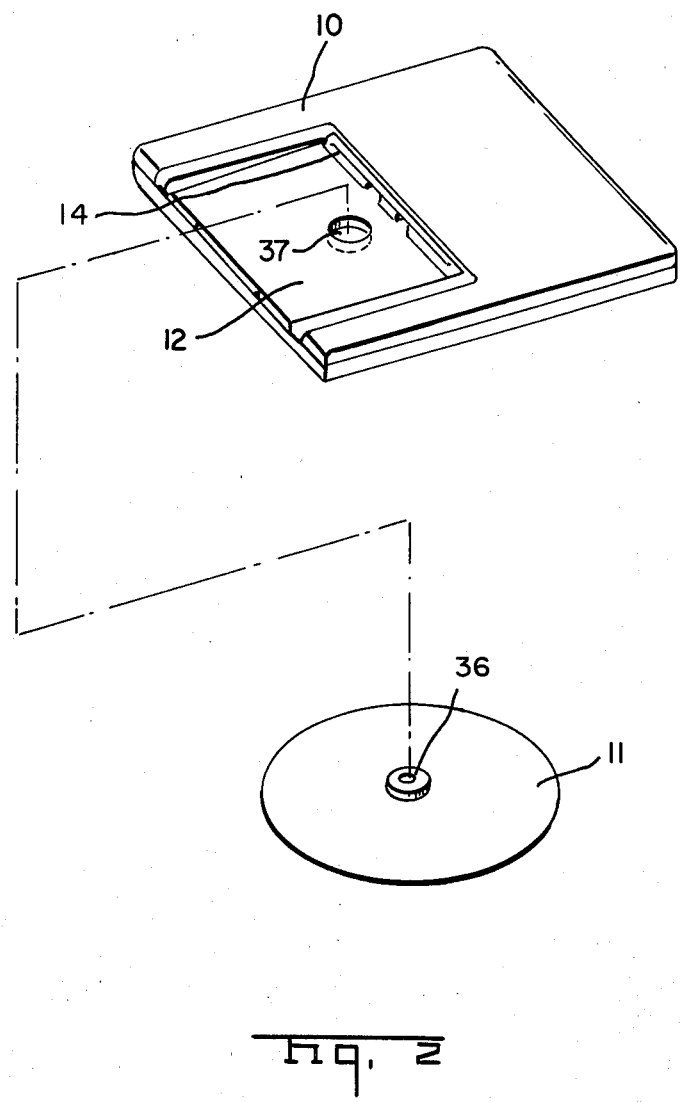
Figure 7:
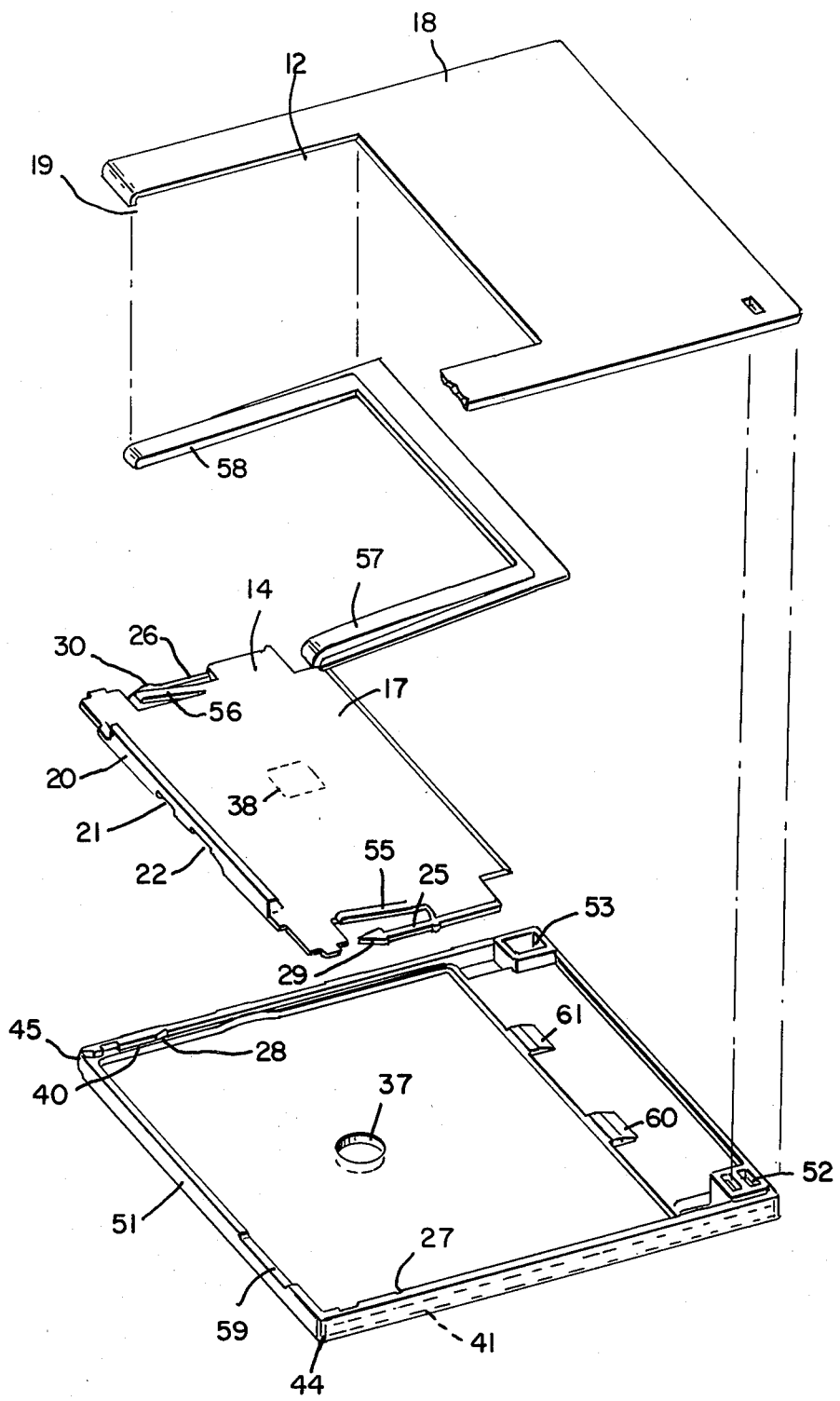
Figure 4:
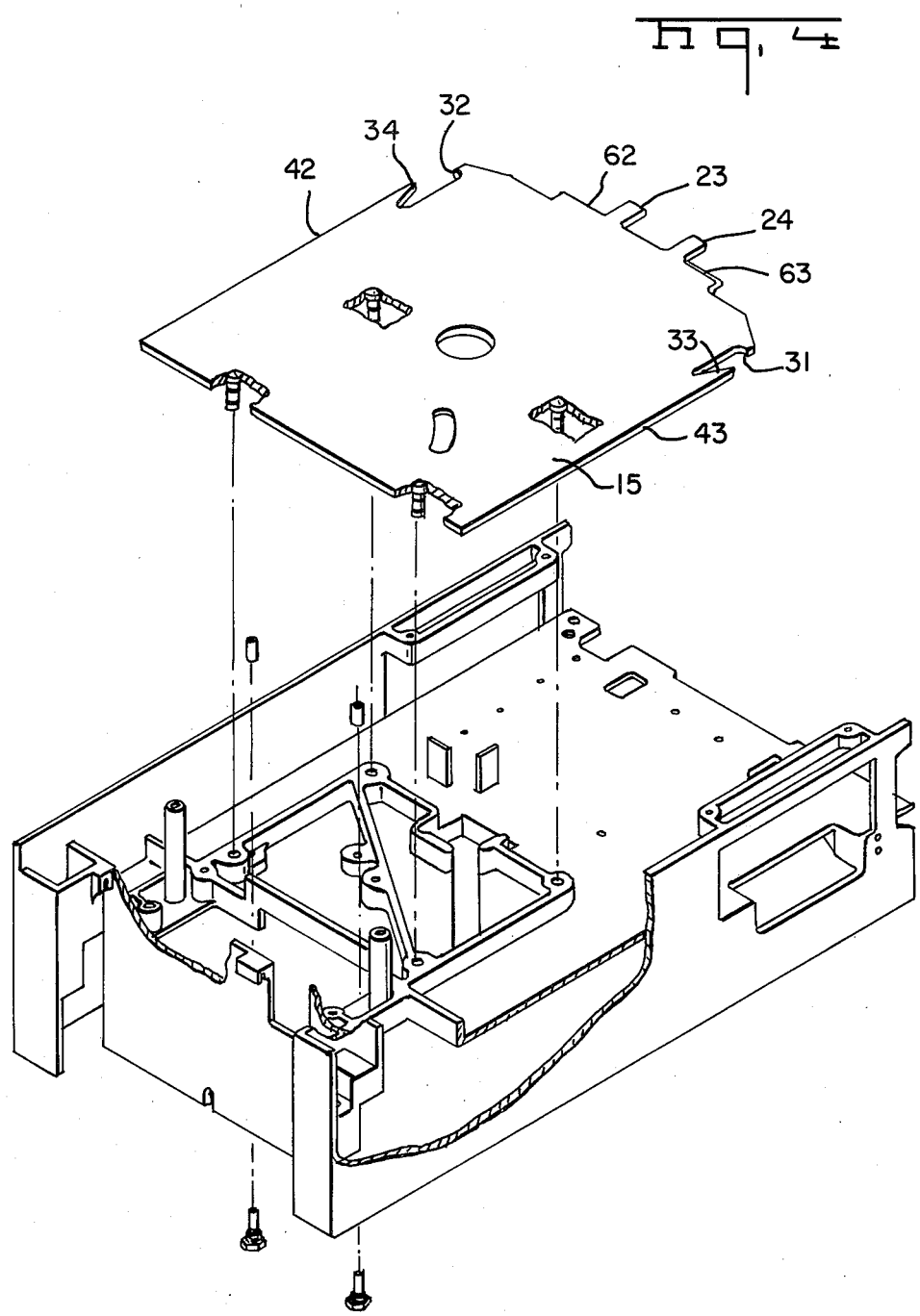

The magnetic disk cartridge 10 (FIG. 2) of this invention is a rigid box containing the flexible magnetic disk 11. The box has an opening 12 (FIG. 2) in one side through which the head and spindle have access to the rotating disk, after the cartridge has been inserted into the disk drive 13. A slider 14 normally closes the opening 12. When the cartridge 10 is inserted into the drive 13, a Bernoulli plate 15 (FIG. 4) engages the slider 14 to move the slider to an open position in which the disk is rotated by the motor 16 in read/write relationship with a magnetic head (not shown).

The slider 14 has a flat portion 17 which normally closes the opening 12 in the cartridge top 18. When the cartridge is inserted in the drive, access to the disk for rotation and reading/writing is through the opening 12. The box also has an open edge 19. This is normally closed by the ridge portion 20 of the slider. The ridge portion 20 has two recessed ramps 21 and 22. When the cartridge is inserted into the drive, two tapered points 23 and 24 on the Bernoulli plate 15 engage the recessed ramps 21 and 22. This lifts the slider 14 out of the opening in the edge so that the plate 15 enters the cartridge through the open edge.

A locking mechanism securely locks the slider in the closed position until the cartridge is inserted into the drive. This locking mechanism includes detents 25 and 26 on the sides of the slider 14. These detents normally engage locking recesses 27 and 28 inside the side edges of the cartridge. The detents include arrow-shaped member 29 and 30 each of which has an outside ledge which engages the locking recess (27 or 28) and an inside ledge which engages a tab (31 or 32) on the Bernoulli plate 15. When the cartridge is inserted into the drive, ramps 33 and 34 on the Bernoulli plate engage the outside surfaces of the arrow members 29 and 30 to move them inwardly. This withdraws the outside ledges of the arrow members from the locking recesses 27 and 28, thereby unlocking the mechanism and facilitating complete insertion of the cartridge into the drive. When the cartridge is removed from the drive, the tabs 31 and 32 on the Bernoulli plate engage the inside ledges of the arrow members 29 and 30. This pulls the slider to the closed position as the cartridge is withdrawn. The engagement of the tabs 31 and 32 with the inside ledges of the arrow members 29 and 30 also prevents removal of the cartridge from the drive unless the detents are in the locked position, i.e., with the outside ledges of the arrow members 29 and 30 extending into the locking recesses 27 and 28.

When the slider 14 is in the closed and locked position, the rigid box making up the cartridge of this invention completely covers and protects the magnetic disk 11. The slider is locked securely and can only be opened by inserting the cartridge into the disk drive or by a special tool designed specifically for that purpose. The mechanism which accomplishes this is not apparent to the user and this reduces the possibility of the user tampering with the magnetic disk.

The magnetic disk 11 has a hub 36 which is magnetically engaged by the shaft of the disk drive motor. This hub 36 is positioned in a molded hub recess 37. A protrusion 38 on the inside of the flat portion of the slider retains the hub 36 in the hub recess 37 when the slider is in the closed position. As the cartridge is inserted into the drive, thereby moving the slider to the open position, the flat surface of the Bernoulli plate 15 engages the disk to maintain the hub 36 in the hub recess 37.

As the cartridge is inserted into the disk drive, the edges 42 and 43 of the Bernoulli plate travel along internal grooves 40 and 41 along the sides of the cartridge. This guides the cartridge into proper position. External guide grooves 44 and 45 engage guide tracks 46 and 47 in the drive. The external grooves 44 and 45 run the length of the cartridge base. If an attempt is made to insert the cartridge upside down, interference prevents insertion.

During insertion or removal, the ridge portion 20 of the slider must pass beneath triangular bumps 48 and 49 on the guide brackets 50 and 50a. (Bump 48 protrudes through hole 48a into the cartridge insertion path.) During removal, this ensures that the front edge of the slider is seated on the front edge and the slider 14 is securely locked. If an attempt is made to insert a partially opened cartridge, the ridge portion 20 interferes with bumps 48 and 49, thereby preventing insertion of a cartridge in faulty condition.

For assembly purposes, there are two raised areas, 52 and 53, at the rear of the cartridge base 51 (FIG. 3). These aid in properly positioning cartridge top 18.

The front edge of the slider is preloaded against the front edge of the cartridge base 51 by preload springs 55 and 56. This avoids a gap along the front edge of the cartridge. Second springs 57 and 58 seal the triangular space between cartridge top 18 and the slider 14. The springs 57 and 58 prevent the insertion of a cartridge which has an open slider.

A cut-away 59 at the front of the cartridge base ensures clearance between the magnetic head and the cartridge during insertion even if the cartridge base 51 is slightly warped.

Stops 60 and 61 are molded into the cartridge base to limit the motion during insertion. These stops register on shoulders 62 and 63 of the Bernoulli plate. This accurately positions the cartridge prior to engaging the drive motor.

While a particular embodiment of the invention has been shown and described, modifications are within the true spirit and scope of the invention. The appended claims are, therefore, intended to cover all such modifications.

What is claimed is:

1. A magnetic disk cartridge for use with a disk drive of the type having a fixed Bernoulli plate against which a flexible magnetic disk is rotated in read/write relationship with a magnetic head, said cartridge comprising:
   a rigid box containing said flexible magnetic disk, said box having an opening in one side thereof through which said disk is rotated in said read/write relationship; and
   a slider which normally closes said opening, said slider being engaged by said plate when said cartridge is inserted into said drive to move said slider to an open position in which said disk is rotated in said read/write relationship.

2. The cartridge recited in claim 1 wherein said box has an open edge, said slider having a flat portion which normally closes said opening in one side and a ridge portion which normally closes said open edge so that said plate enters said cartridge through said open edge as said slider is engaged by said plate.

3. The cartridge recited in claim 2 wherein said ridge portion has recessed ramps which are engaged by tapered points on said plate to lift said slider out of said open edge whereby said plate can enter through said open edge.

4. The cartridge recited in claim 1 further comprising:
   locking means for locking said slider in the closed position, said locking means being released by said plate when said cartridge is inserted into said drive.

5. The cartridge recited in claim 4 wherein said locking mechanism includes detents on each side of said slider which engage locking recesses on said box, inside the side edges, said detents being engaged by ramps on the side of said plate to move said detents out of said locking recesses.

6. The cartridge recited in claim 5 wherein each detent includes an arrow shaped member with an outside ledge which engages a locking recess and an inside ledge which engages a tab on said plate when said outside ledge is not in said locking recess, so that said slider is moved to a closed position when said cartridge is removed from said drive and so that said cartridge cannot be removed from said drive unless said detents are in the locked position.

7. The cartridge recited in claim 1 wherein said flexible magnetic disk has a hub, said cartridge having a hub recess in which said hub is positioned.

8. The cartridge recited in claim 7 wherein said slider has a protrusion on the inside of a flat portion thereof, said protrusion retaining said hub in said hub recess when said slider is in the closed position.

9. The cartridge recited in claim 1 wherein said cartridge has internal grooves along the side edges of said box to guide said cartridge along the side of said plate as said cartridge is inserted into said drive.

10. The cartridge recited in claim 1 further comprising:
external guide grooves along two edges of said cartridge, said grooves engaging guide tracks in said drive to ensure proper orientation of said cartridge when it is inserted into said drive.

11. A magnetic disk drive of the type which reads and writes magnetically recorded information from a magnetic disk contained in a cartridge comprising:
a Bernoulli plate fixed in said drive with an edge thereof in proximity to an opening in said drive through which said cartridge is inserted so that said edge of said plate enters said cartridge through an edge thereof to position said flexible disk against said plate;
a magnetic head; and
means for rotating said disk against said plate in read/write relationship with said magnetic head.

12. The combination of a magnetic disk drive and a disk cartridge comprising:
a rigid box forming said cartridge;
a flexible magnetic disk enclosed in said box;
a Bernoulli plate fixed in said drive with an edge thereof in proximity to an opening in said drive through which said cartridge is inserted so that said edge of said plate enters said cartridge through an edge of said cartridge, said flexible magnetic disk being positioned against said plate;
a magnetic head; and
means for rotating said disk against said plate in read/write relationship with said magnetic head.

13. The combination recited in claim 12 further comprising:
locking means for locking said slider in the closed position, said locking means being released by said plate when said cartridge is inserted into said drive.

14. The combination recited in claim 12 wherein said cartridge further comprises:
a slider which normally closes an opening in said cartridge, said slider being engaged by said plate when said cartridge is inserted into said drive to move said slider to an open position in which said disk is rotated in said read/write relationship.

15. The combination recited in claim 14 wherein said opening in said cartridge includes an open side and an open edge in said box, said slider having a flat portion which normally closes said open side and a ridge portion which normally closes said open edge so that said plate enters said cartridge through said open edge as said slider is engaged by said plate.

16. The combination recited in claim 12 wherein said cartridge has internal grooves along the side edges of said box to guide said cartridge along the sides of said plate as said cartridge is inserted into said drive.

17. The combination recited in claim 12 wherein said drive has guide tracks extending from the opening in said drive through which said cartridge is inserted; and
external guide grooves along two edges of said cartridge, said grooves engaging said guide tracks to ensure proper orientation of said cartridge when it is inserted into said drive.

* * * * *